Jan. 12, 1960 H. M. STEVENS 2,920,926
TRACTOR CHAIN LINK
Original Filed March 18, 1955
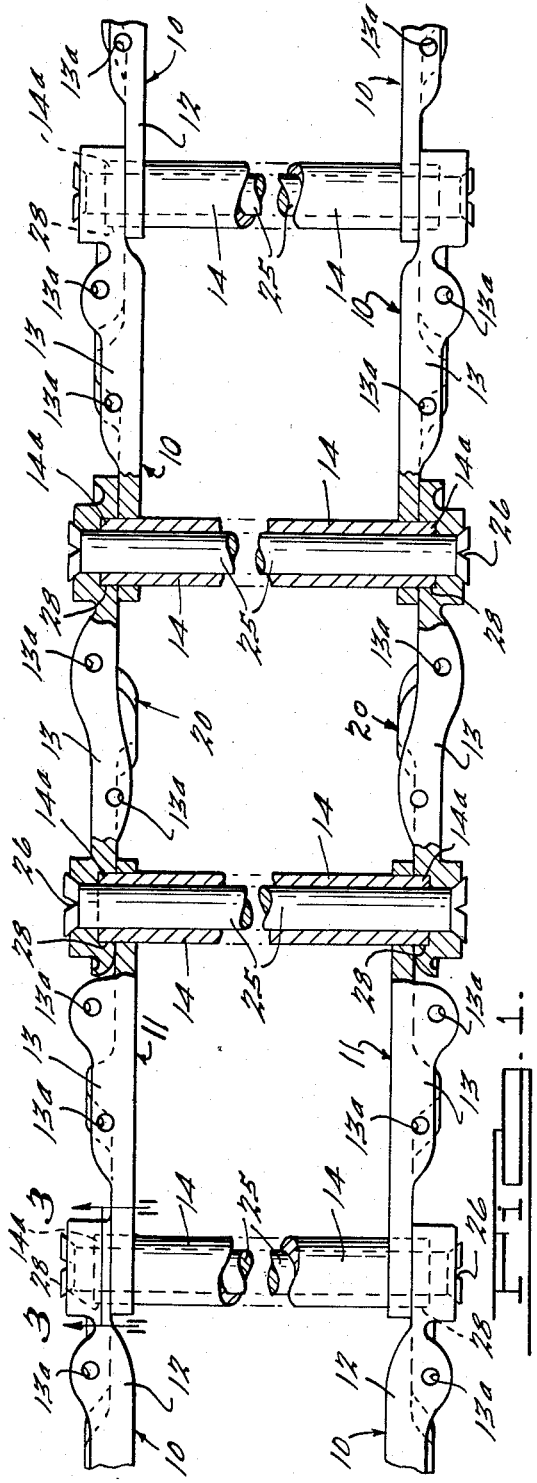
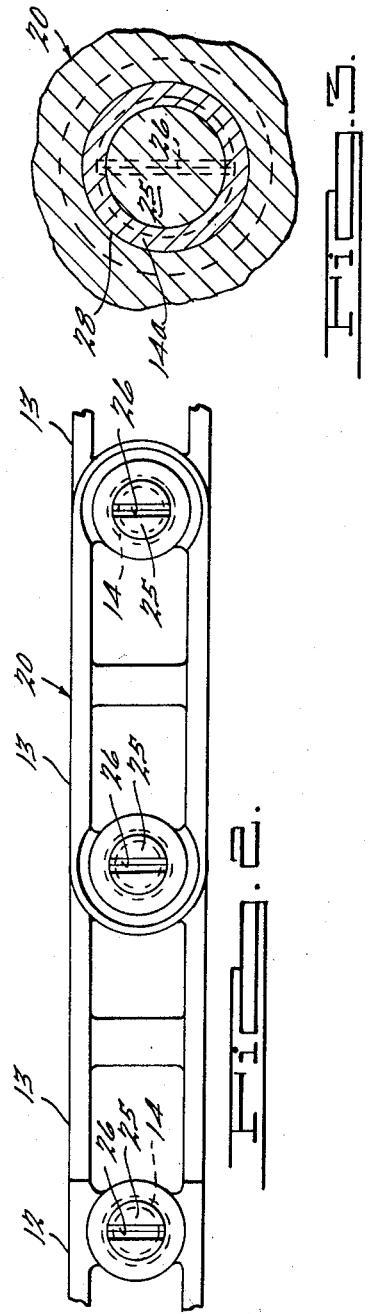
INVENTOR.
Harris M. Stevens.
BY
John F. Stark
ATTORNEY.

United States Patent Office 2,920,926
Patented Jan. 12, 1960

2,920,926
TRACTOR CHAIN LINK

Harris M. Stevens, Hillman, Mich., assignor of one-half to William O. Gilliland, Alpena, Mich.

Substitute for abandoned application Serial No. 495,190, March 18, 1955. This application August 30, 1956, Serial No. 607,045

4 Claims. (Cl. 305—10)

This invention relates to endless track or chain, and, more particularly, to a master or connecting link for such chain as used in vehicles of the self-laying track variety. This application is filed in place of abandoned application S.N. 495,190.

Heretofore numerous and varied link designs have been used; however, all such constructions have had master or connecting links, for joining opposite ends of the chain, of weaker or stronger cross sectional strength. Such an arrangement has given voice to the old saying "A chain is only as strong as its weakest link." In the present construction the aforementioned disadvantages have been overcome by an improvement which makes all the chain links, including the master connecting link, of equal strength, of course barring any unintentional metallographic failure. For example, in conventional tractor chain construction any wear in a weak link will be transmitted through the chain to the teeth of the driving sprocket, at one end, and the teeth of the idling sprocket, at the opposite end. This wear in time is accentuated and in turn changes the pitch of the chain finally to a point of failure at a considerable cost of money and loss of down time on the vehicle. With the improved construction of the present invention extensive field experience has shown chain life to be improved fifty percent better than all known commercially available units. Such a construction is of great consequence both in time and labor saving economics without incurring any additional expense in chain manufacturing cost.

Accordingly, the present invention proposes a simple and expedient remedy by a proper redesign of the master connecting link of an endless tractor chain, wherein such master link is of exactly the same strength and wearing ability as all of the other links in the chain. Conversely stated, the purpose of this invention is to provide a master link which will not wear unevenly with respect to the adjoining tread links.

A further object of the present invention resides in the construction of a master link of an endless chain wherein economies of fabrication are effected together with greatly increased improvement of useful chain life.

These and other objects and advantages of the present invention will become evident from a study of the following specification and the drawing forming a part thereof when taken together in conjunction with the appended claims.

In the drawing like reference characters refer to similar parts in the several views, and in which:

Fig. 1 is a fragmentary top view, partly in section, of a master connecting link for an endless chain according to this invention with track shoes or treads omitted for clarity, and;

Fig. 2 is a side view of a portion of chain shown in Fig. 1 and;

Fig. 3 is an end sectional view of a portion of the master link taken on the line 3—3 of Fig. 1.

In the drawing, a typical recessed bushing tractor tread is made up of connecting individual tread links, generally designated 10. Each tread link comprises a pair of rail links 12 held in spaced parallel alignment by a hollow bushing 14 welded or otherwise secured in fixed relation thereto. These bushings 14 are provided with end portions 14a which extend through the rail links. In the particular embodiment of the tractor tread for which the present device is intended, each conventional rail link 10 is counterbored on the inner face on one end 28, while the male outer end of the bushing 14 is exposed on the opposite end 14a. The first end of the rail link overlies the end of the next adjacent rail link in one direction while the opposite end underlies the end of the next rail link in the other direction. The ends 14a of the bushing extend through the rail links 12 at the end portions thereof, thus serving to hingedly connect the adjacent tread links 10.

From the foregoing it can thus be seen that in a conventional chain construction, as distinguished from the present invention, the master link connection for the tractor tread must be made by providing a hollow bushing of sufficient length to extend only between the rail links so that the opposite ends of the tread may be mated male and female. A shouldered pin is then extended through the hollow bushing, and the mated ends of the rail links, and swaged to join the tread. This pin must then take the wear at that joint which soon results in a loose connection as wear takes place which allows the tread to stretch slightly placing additional wear on the adjacent tread links and allowing the bushings thereof to "crawl" on the driving sprockets. Eventually the pitch of the chain is changed and failure results with a loss of downtime on the vehicle. With the present invention the useful life of a conventional chain has been increased by fifty percent, and considering the high initial cost of such a chain for large tractor vehicles great savings are effected.

The master link of the present invention is comprised of a pair of male master links 11 and a pair of female master links 20. The male master links have bushing portions 14 which extend through side rails 12 at both ends. When the tread is being assembled, the male master links 11 are substituted for the last pair of regular links 10 at one end of the chain. This leaves the opposite ends of the chain with rail links 10 and 11 all having male bushing ends 14a extended through the side rails 12. The remaining pair of female master rail links 20 will then mate with the male ends of links 10 and 11. The ends 14a of the bushing which extend through each end of the master rail links 11 provide the same hinged connection as in other conventional links 10 of the tread so that the joints all wear evenly. The master links 20 are secured by shouldered pins 25 extending through axial holes in bushings 14 and bushing ends 14a, the same as all the conventional links 10, and swaged as at 26 to retain them in place, but these pins do not take any of the wear of the joint. The wear is distributed evenly and uniformly between the counterbored surfaces 28 and bushing ends 14a on each and every link of the tread. The side rails 12 have a longitudinal body portion extending between its opposite ends with a flattened horizontal surface 13 arranged to provide an attachment pad for reception of a multiplicity of generally rectangular tractor tread pieces (not shown) secured thereto by attachment hole means 13a.

From the foregoing description, it will readily be apparent the invention possesses the many advantages as first enumerated in the objects of this specification. However, the single embodiment of the invention shown will now be suggestive to many variations by persons skilled in this art and the scope of the invention is considered commensurate with the breadth of the appended claims.

What I claim is:

1. The combination in an endless chain comprised of a succession of uniform strength links hingedly secured together, said links consisting of a series of side rails held in spaced parallel relation by hollow bushings with end portions extended through said side rails on one end and the inner faces of the side rails counterbored at the opposite end, the counterbored end of each of said rails overlying the extended end of the next adjacent link in one direction while the opposite extended end underlies the counterbored end of the next rail in the other direction to hingedly connect adjacent links, with anchor pin means securing said rails and bushings from separation without absorbing wear thereon; of a pair of male master connecting links hingedly connected to one end of the chain, said male master connecting links terminating in hollow bushing elements extended through side rails of said master links, a second pair of female master links for connecting the other end of the chain with the male master connecting links comprising a pair of side rails provided with round counterbored extremities on its inner faces adapted to mate over extended male ends of hollow bushings of the other end of chain and said male master links, and anchor pin means securing said rails of said female and male links from separation without the pins absorbing wear.

2. The combination in an endless chain comprised of a succession of uniform strength links hingedly secured together, said links consisting of a series of side rails held in spaced parallel relation by bushings with end portions extended through said side rails on one end and the inner faces of the side rails counterbored at the opposite end, the counterbored end of each of said rails overlying the extended end of the next adjacent link in one direction while the opposite extended end underlies the counterbored end of the next rail in the other direction to hingedly connect adjacent links, with anchor pin means extended from said bushings securing said rails and bushings from separation without absorbing wear thereon; of a pair of male master connecting links hingedly connected to one end of the chain, said male master connecting links terminating in hollow bushing elements extended through side rails of said master links, a second pair of female master links for connecting the other end of the chain with the male master connecting links comprising a pair of side rails terminated at opposite ends in round counterbored extremities on the inner faces adapted to mate over extended ends of hollow bushings of said other end of the chain and said male master links, and anchor pin means extended through said counterbored side rails and bushings securing said rails of said female and male links from separation without the pins absorbing wear.

3. The combination in an endless chain comprised of a succession of uniform strength links hingedly secured together, said links consisting of a series of side rails offset in their longitudinal dimension held in spaced parallel relation by hollow bushings with end portions extended through said side rails on one end and the inner faces of the side rails counterbored at the opposite end, the counterbored end of each of said rails overlying the extended end of the next adjacent offset link in one direction while the opposite extended end underlies the counterbored end of the next rail in the other direction to hingedly connect adjacent links, with anchor pin means extended through said hollow bushings securing said rails and bushings from separation without absorbing wear thereon; of a pair of male master connecting links hingedly connected to one end of the chain, said male master connecting links terminating in hollow bushing elements extended an equal amount through side rails of said master links, a second pair of female master links for connecting the other end of the chain with the male master connecting links comprising a pair of side rails terminated at opposite ends in round counterbored extremities on the inner faces adapted to mate over extended male ends of hollow bushings of the other end of chain and said male master links, and anchor pin means extended through said counterbored side rails and hollow bushings securing said rails of said female and male links from separation without the pins absorbing wear.

4. The combination in an endless chain comprised of a succession of uniform strength links hingedly secured together, said links consisting of a series of side rails offset in their longitudinal dimension an amount equal to the thickness thereof and held in spaced parallel relation by hollow bushings with end portions extended through said side rails on one end and the inner faces of the side rails counterbored at the opposite end, the counterbored end of each of said rails overlying the extended end of the next adjacent offset link in one direction while the opposite extended end underlies the counterbored end of the next rail in the other direction to hingedly connect adjacent links, with anchor pin means extended through said hollow bushings securing said rails and bushings from separation without absorbing wear thereon; a first master connecting link comprising a pair of side rails held in spaced parallel relation to one another by a first hollow bushing, said first bushing having opposite end portions, one of said bushing end portions being extended through one end of one of said pair of side rails and the other bushing end portion being extended through one end of the other of said pair of side rails, the side rail ends of said first master connecting link which are bridged by said first hollow bushing being overlaid by the ends of a pair of side rails which form the terminating link at one end of the chain, said first hollow bushing extending into the ends of the chain-terminating-link side rails which overlie the ends of said first master connecting link to thereby form a pivotal connection, the opposite end of each of said first master link side rails being overlaid respectively by one end of each of a pair of parallel spaced side rails of a second master connecting link, the overlaid ends of the side rails of the first and second master links being hingedly connected by a second hollow bushing extending at each bushing end through the end of said first master link side rail and into the overlying end of the second master link side rail, the opposite ends of the side rails of the second master link overlying the ends of a pair of side rails which form the terminating link at the second end of the chain, the overlaid ends of the side rails of the second master link and chain-terminating-link being hingedly connected by a third hollow bushing extending at each bushing end through the end of the chain-terminating-link side rail and into the overlying end of the second master link side rail, and anchor pin means securing said side rails and hollow bushings from separation without the pin means absorbing wear.

References Cited in the file of this patent

UNITED STATES PATENTS

| 1,237,814 | Porter et al. | Aug. 21, 1917 |
| 1,958,139 | Gammeter | May 8, 1934 |
| 2,376,864 | Eberhard | May 29, 1945 |
| 2,621,981 | Schick | Dec. 16, 1952 |

FOREIGN PATENTS

| 543,941 | Great Britain | Mar. 20, 1952 |